United States Patent
Janson et al.

(10) Patent No.: US 7,293,637 B2
(45) Date of Patent: Nov. 13, 2007

(54) MODULAR TWIN CLUTCH TRANSMISSION INPUT FOR HYBRID VEHICLE

(75) Inventors: David Janson, Plymouth, MI (US); Shaun Knowles, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 301 days.

(21) Appl. No.: 11/078,089

(22) Filed: Mar. 11, 2005

(65) Prior Publication Data

US 2006/0144665 A1 Jul. 6, 2006

Related U.S. Application Data

(60) Provisional application No. 60/641,700, filed on Jan. 6, 2005.

(51) Int. Cl.
*B60K 17/02* (2006.01)
*B60K 6/00* (2006.01)
*F16D 25/10* (2006.01)

(52) U.S. Cl. .................. 192/87.11; 192/48.8; 180/65.2
(58) Field of Classification Search ...................... None
See application file for complete search history.

(56) References Cited

U.S. PATENT DOCUMENTS

| | | |
|---|---|---|
| 3,185,274 A | 5/1965 | Maurice |
| 4,026,400 A | 5/1977 | Rawlings |
| 4,214,653 A | 7/1980 | Slack |
| 4,236,620 A | 12/1980 | Beccaris |
| 4,440,281 A | 4/1984 | Hauguth |
| 4,463,621 A | 8/1984 | Fisher |
| 6,463,821 B1 | 10/2002 | Reed, Jr. et al. |
| 6,668,953 B1* | 12/2003 | Reik et al. .................. 180/53.8 |
| 6,698,562 B2 | 3/2004 | Teraoka et al. |
| 6,722,483 B2 | 4/2004 | Damm et al. |
| 2002/0060118 A1 | 5/2002 | Beneton et al. |
| 2003/0024788 A1 | 2/2003 | Damm et al. |
| 2003/0066728 A1 | 4/2003 | Hirt |
| 2003/0066730 A1 | 4/2003 | Zink et al. |
| 2003/0075412 A1 | 4/2003 | Heiartz et al. |
| 2003/0079953 A1 | 5/2003 | Carlson et al. |
| 2003/0085093 A1 | 5/2003 | Heiartz et al. |
| 2003/0106767 A1* | 6/2003 | Beneton et al. .......... 192/111 A |
| 2003/0164274 A1 | 9/2003 | Feldhaus et al. |
| 2003/0164275 A1 | 9/2003 | Feldhaus et al. |
| 2003/0168302 A1* | 9/2003 | Diemer et al. ............. 192/48.1 |

* cited by examiner

*Primary Examiner*—Richard M Lorence
(74) *Attorney, Agent, or Firm*—David B. Kelley; MacMillan, Sobanski & Todd, LLC

(57) ABSTRACT

An assembly for transmitting power from two power sources, such as an internal combustion engine and an electric motor having a rotor, to a transmission input shaft includes a clutch hub driveably connected to the rotor, a first clutch secured to the clutch hub for alternately closing and opening a drive connection between the input shaft and clutch hub, and a second clutch secured to the clutch hub for alternately closing and opening a drive connection between the engine shaft and clutch hub.

8 Claims, 2 Drawing Sheets

| Clutch 36 | Clutch 34 | Motor 14 | Engine 10 |
|---|---|---|---|
| 0 | 0 | 0 | 0 |
| 0 | 1 | 0 | 0 |
| 1 | 0 | 1 | 0 |
| 1 | 1 | 1 | 1 |

*Figure 2*

MODULAR TWIN CLUTCH TRANSMISSION INPUT FOR HYBRID VEHICLE

CROSS-REFERENCE TO RELATED APPLICATION

This application claims the benefit of U.S. Provisional Application No. 60/641,700, filed Jan. 6, 2005.

BACKGROUND OF THE INVENTION

The present invention relates generally to an assembly for transmitting power to an automotive power transmission from two power sources. In particular, it pertains to an assembly for connecting the power sources concurrently or separately to the transmission.

Hybrid vehicles generally have two power sources, a conventional internal combustion engine, and an alternate power source, such as an electric motor. The electric motor is used as a power source in city driving where vehicle kinetic energy can be recovered by regenerative braking, converted to electric and chemical form, and stored in a battery, from which the motor is driven. The internal combustion is most suitable in highway driving, during which wheel braking and opportunities for energy recovery are infrequent, and the engine operates at its greatest efficiency.

In mixed driving conditions, the electric motor and combustion engine may be used together to transmit power to a transmission input shaft, depending on driving conditions and the magnitude of reserve battery capacity. A compact assembly for alternately combining the output of each power source or connecting them individually to the transmission input, while making efficient use of the radial and axial dimensions of the assembly, is a long sought need in the industry.

SUMMARY OF THE INVENTION

The drive assembly of this invention supports the motor, includes multiple clutches for alternately and cooperatively connecting the engine and motor to the transmission input, provides hydraulic paths to the clutches, and incorporates a flywheel and damper assembly for isolating the engine transient vibrations. The assembly is compact and has short axial length to facilitate its being packaged in a front wheel drive vehicle, whose engine and transaxle are arranged transversely with respect to the fore and aft axis of the vehicle. The assembly is functionally robust and easy to assemble. The strategic integration and specific arrangement of the components of the assembly according to this invention help to realize these advantages.

An assembly, according to this invention, for transmitting power from two power sources, an internal combustion engine and an electric motor having a rotor, to a transmission input shaft includes a clutch hub driveably connected to the rotor, a first clutch secured to the clutch hub for alternately closing and opening a drive connection between the input shaft and clutch hub, and a second clutch secured to the clutch hub for alternately closing and opening a drive connection between the engine shaft and clutch hub.

A torsion damper having an input secured to the engine shaft and output secured to the second clutch dampens torsional displacements between the engine shaft and second clutch. A flywheel, secured to the engine shaft and second clutch, is arranged in parallel with the torsion damper and preferably is formed integrally with the damper.

A front support is formed with a first and second clutch-apply passages, and a first lube passage. A clutch hub is formed with a third clutch-apply passage for communicating the first clutch apply passage and a cylinder of the first clutch. A fourth clutch apply passage communicates the second clutch-apply passage and a cylinder of the second clutch. A second lube passage carries fluid lubricant from the first lube passage to the first and second clutches.

A seal cover is secured to a clutch housing for sealing a space containing the first and second clutches and motor within the clutch housing against passage of hydraulic fluid. The seal cover and clutch housing contain the clutches and motor in a lubricated wet space close to the transmission case interior and away from the relatively dry engine compartment.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a chart showing the effect of clutch state on the potential drive connections to the input shaft.

DESCRIPTION OF THE PREFERRED EMBODIMENT

Figure 1:
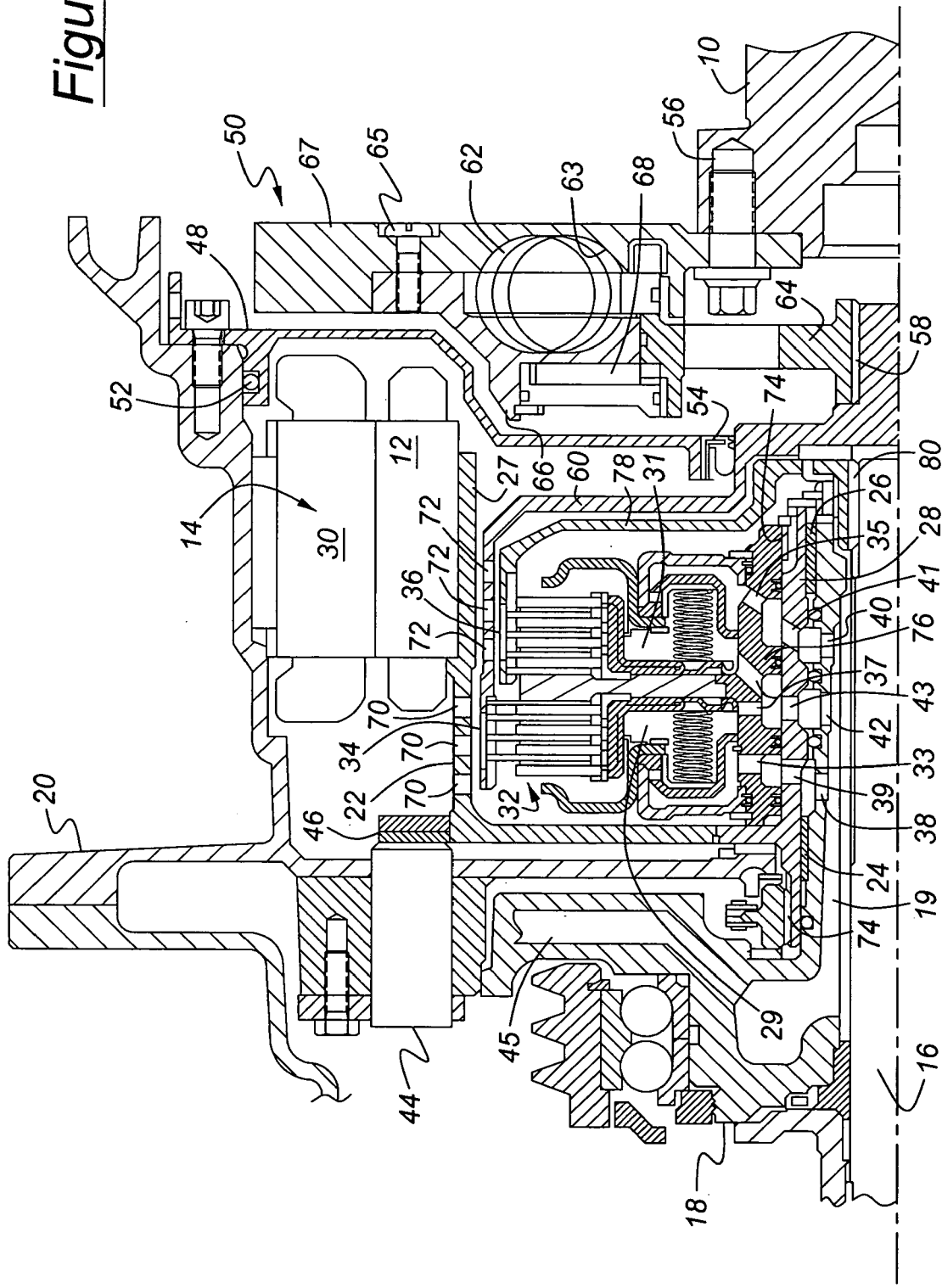
FIG. 1 is a cross sectional side view showing a modular arrangement of components for driveably connecting an electric motor and engine alternately or concurrently through two clutches to a transmission input shaft.

Referring now to the drawing, the engine 10 of an internal combustion engine and the rotor 12 of an electric motor 14 are driveably connected to, and disconnected from the input shaft 16 of a power transmission. The wheels of a motor vehicle are driveably connected to the input shaft 16 through the transmission, which can produce multiple stepped ratios or continuously variable ratios of the speed of its input and output.

A front support 18 is secured to a clutch housing 20, and includes a sleeve-like hub 19, which surrounds and extends axially parallel to the input shaft 16. A rotor hub assembly 22, supported on the front support 18 on axially spaced bushings 24, 26, includes an outer cylindrical drum 27 and an inner cylindrical sleeve-like hub 28, which surrounds and extends axially parallel to the hub 19 of the front support 18.

The rotor 12 of the motor 14 is supported on the outer cylindrical drum 27 of the rotor hub assembly 22, the stator 30 surrounds the rotor 12 and is supported on the clutch housing 20.

Clutches 34, 36 are hydraulically actuated friction clutches. The twin clutch assembly 32 includes a disconnect clutch 34 for connecting and disconnecting the engine shaft 10 and clutch hub 76, and a launch clutch 36 for connecting and disconnecting the clutch hub 76 and input shaft 16. Launch clutch 36 can transmit engine torque and motor torque to the input shaft 16 separately or concurrently depending on the state of clutch 36. Clutches 34, 36 include respective pressure balance volumes 29, 31 containing hydraulic fluid, which volumes correct for the effect of centrifugal force on the magnitude of hydraulic pressure in the clutch actuation cylinders.

The hub 76 of the twin clutch assembly 32 is formed with axially spaced and radially directed fluid passages 33, 35, 37, which pass through the thickness of the hub. Passage 33 provides a line through which hydraulic apply pressure is communicated to the apply side of the cylinder of disconnect clutch 34. Passage 35 provides a line through which hydraulic apply pressure is communicated to the apply side of the cylinder of launch clutch 36. Passages 37 provide lines through which fluid is supplied to the balance volumes of disconnect clutch 34 and launch clutch 36, respectively.

Hydraulic passages 38, 40, and 42 are formed in the front support 18 and are located radially inside the twin clutch assembly 32, thereby minimizing the axial length of the assembly. Hydraulic passage 38 is aligned with passage 33 in the clutch hub 76 and passage 39 in the rotor hub 28. Passages 38, 33, 39 together provide a line through which hydraulic apply pressure is communicated to the apply side of the cylinder of disconnect clutch 34. Hydraulic passage 40 is aligned with passage 35 in the clutch hub 76 and passage 41 in the rotor hub 28. Passages 40, 35, 41 together provide a line through which hydraulic apply pressure is communicated to the apply side of the cylinder of the launch clutch 36. Hydraulic passage 42 is aligned with passage 37 in the clutch hub 76 and passage 43 in the rotor hub 28. Passages 42, 37, 43 together provide a line through which fluid is supplied to the balance volumes of disconnect clutch 34 and launch clutch 36, respectively.

FIG. 1 shows a hydraulic fluid passage 45 formed in the front support 18, through which hydraulic path 38 is pressurized and vented. Similar passages are formed in the front support 18 for pressurizing and venting hydraulic path 40 and for supplying fluid to path 42.

A sensor 44, located adjacent a sensor wheel 46 secured to the rotor hub assembly 22, produces an electronic signal representing the rotational speed and angular position of the rotor 12, in response to movement of the wheel. The sensor 44 and sensor wheel 46 are located radially outside and axially rearward of the twin clutch assembly 32.

A seal cover assembly 48, secured to the clutch housing 20, hydraulically and physically separates the twin clutch assembly 32 from an integrated flywheel/damper assembly 50 and the rest of the engine compartment. The seal cover assembly 48 includes an outer, static hydraulic seal 52 and an inner, dynamic hydraulic seal 54. The outer seal 52 prevents fluid leakage past the seal at the clutch housing 20 interface; the inner seal 54 prevents fluid leakage past that seal at the twin clutch assembly 32 interface. The inner seal 54 is a relatively small diameter radial seal, which minimizes sliding resistance produced by the seal between the seal cover 48 and the engine output.

The integrated flywheel/damper assembly 50 is secured at its input side by bolts 56 to the engine shaft 10 and is connected at its output side by a spline 58 to a clutch shell 60. The flywheel/damper assembly 50 contains compression springs 62 arranged mutually in parallel in the annular damper recess 63. The springs 62 are actuated by rotational displacement of the engine shaft 10 relative to the drive hub 64 causing the springs to compress and expand in frictional contact with walls of the damper recess 63, thereby dampening the relative torsional displacement. In this way, the flywheel/damper assembly 50 transmits input engine torque to the twin clutch assembly 32. The cover plate 66 of the flywheel/damper assembly 50 is secured by bolts 65 to the flywheel portion 67, which is secured by bolts 56 to the engine shaft 10.

The integrated flywheel/damper assembly 50 is located outside the space that is sealed by the seal cover assembly 48 and radial outward of the engine shaft. Its location makes efficient use of the space provided, and although the sealed volume is located close to the damper, it is hydraulically isolated from the damper. The integrated flywheel/damper assembly 50 also incorporates a viscous shear plate 68 to further improve robustness and efficiency.

An arrangement of the elements of an assembly according to this invention as described facilitates assembly, particularly the arrangement of the seal cover assembly 48, which separates the wet environment of the twin clutch assembly 32 and motor 14 from the dry environment of the integrated flywheel/damper assembly 50 and engine compartment.

The motor 14 is substantially aligned radially with the twin clutch assembly 32, which reduces the axial length of the drive assembly and facilitates cooling the motor. The rotor hub assembly 22 and clutch shell 60 are each formed with radially directed holes 70, 72 distributed around the surfaces on which they are formed. The holes 70, 72 provide passages through which hydraulic fluid is directed from the twin clutch assembly 32 radially outward toward the motor for carrying heat from the motor to an oil cooler, where heat in the transmission fluid is transferred to ambient air before returning to a fluid sump.

Rotor hub assembly 22, which is connected at its hub 28 by a spline 74 to clutch hub 76, completes a torque path between the rotor 12 and clutch hub 76. Disconnect clutch 34 alternately closes and opens a drive connection between clutch hub 76 and engine shaft 10 through the flywheel damper 50, spline 58 and clutch shell 60 as clutch 34 is engaged and disengaged, respectively.

Clutch shell 78 is connected by spline 80 to input shaft 16. Launch clutch 36 alternately closes and opens a drive connection between input shaft 16 and clutch hub 76 as clutch 36 is engaged and disengaged, respectively.

In FIG. 2, an engaged state of clutches 34, 36 is indicated by "1" and their disengaged state by "0". A closed drive connection between the input shaft 16 and either the motor 14 or engine shaft 10 due to the state of the clutches is represented "1" and a corresponding open drive connection by a "0." When clutches 34 and 36 are disengaged concurrently, input shaft 16 is driveably disconnected from the engine shaft 10 and rotor 12. When clutch 36 is engaged and clutch 34 is disengaged, input shaft 16 is driveably connected to the rotor 12, but the engine shaft 10 remains disconnected from the input shaft. When clutches 34 and 36 are engaged concurrently, input shaft 16 is driveably connected to the engine shaft 10 and rotor 12.

The drive assembly is assembled in steps beginning with the front support 18 and clutch housing 20, to which sensor 44 is attached. The rotor hub 22 is inserted into the front support 18 with the sensor wheel 46 attached. Then the clutch hub 76 and clutches 34, 36 are installed, and the clutches are secured to the hub by snap rings. The cylinder for clutch 36 is installed first followed by the cylinder for clutch 34. The seal cover assembly 48 is installed over the clutches. Finally, the flywheel and damper assembly 50 is installed on the engine shaft 10 prior to connecting the engine to the transmission.

The assembly provides support for the motor 14 and twin clutch assembly 32, provides hydraulic paths to the clutches 34, 36, and incorporates a flywheel and damper assembly 50 in a compact, short axial length arrangement that is functionally robust and easy to assemble.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An apparatus for transmitting power among multiple power sources and a transmission input, comprising:
   an internal combustion engine including a shaft;
   an electric motor including a rotor;
   a transmission input;
   a clutch hub driveably connected to the rotor;
   a first clutch secured to the clutch hub, for alternately closing and opening a drive connection between the transmission input and clutch hub; and
   a second clutch secured to the clutch hub, for alternately closing and opening a drive connection between the engine shaft and clutch hub;
   a support hub having first and second fluid passages; and
   a rotor hub assembly secured to the rotor, driveably connected to the clutch hub, and having a third fluid passage communicating with the first fluid passage, and a fourth fluid passage communicating with the second fluid passage; and wherein the clutch hub includes:
   a fifth fluid passage communicating with the first and third fluid passages for communicating with a cylinder of the first clutch; and
   a sixth fluid passage communicating with the second and fourth fluid passages for communicating with a cylinder of the second clutch.

2. The apparatus of claim 1, further comprising:
   a torsion damper having an input secured to the engine shaft and an output secured to the second clutch, for dampening rotational displacement between the engine shaft and second clutch.

3. The apparatus of claim 1, further comprising a torsion damper for dampening rotational displacement of the engine shaft relative to the second clutch, said damper including:
   a flywheel secured to the engine shaft, including a portion of a recess; and
   a cover plate secured to the flywheel, including a second portion of the recess; and
   compression springs located in the recess, producing a resilient drive connection between the second clutch and the engine shaft.

4. The apparatus of claim 1, wherein:
   the support hub further includes a first lube passage
   the rotor hub assembly further includes a second lube passage communicating with the first lube passage; and
   the clutch hub further includes a third lube passage communicating with the first and second lube passages.

5. The apparatus of claim 1, further comprising:
   a clutch housing surrounding the first and second clutches and the motor and providing an opening; and
   a seal cover secured to the clutch housing and closing the opening, for sealing a space containing the first and second clutches and motor within the clutch housing against passage of hydraulic fluid.

6. An apparatus for transmitting power among multiple power sources and a transmission input, comprising:
   an internal combustion engine including a shaft;
   an electric motor including a rotor;
   a transmission input aligned with a longitudinal axis;
   a rotor hub supporting the rotor, substantially aligned with the axis, located radially outward of the input, extending along a portion of a length of the input;
   a clutch hub driveably connected to the rotor, substantially aligned with the axis, located radially outward of the rotor hub, and extending along a portion of a length of the input;
   a first clutch secured to the clutch hub, for alternately closing and opening a drive connection between the transmission input and clutch hub;
   a second clutch secured to the clutch hub, for alternately closing and opening a drive connection between the engine shaft and clutch hub; and
   a support hub substantially aligned with the axis, located radially outward of the input and radially inward of the rotor hub, extending along a portion of a length of the input, and including first and second fluid passages communicating with the first and second clutches.

7. The apparatus of claim 6 wherein the rotor hub is driveably connected to the clutch hub.

8. The apparatus of claim 6 wherein:
   the support hub further includes a first lube passage;
   the rotor hub further includes a third fluid passage communicating with the first fluid passage, a fourth fluid passage communicating with the second fluid passage, and a second lube passage communicating with the first lube passage; and
   the clutch hub further includes a fifth fluid passage communicating with the first and third fluid passages for communicating with a cylinder of the first clutch, a sixth fluid passage communicating with the second and fourth fluid passages far communicating with a cylinder of the second clutch, and a third lube passage communicating with the first and second lube passages.

* * * * *